(12) United States Patent
Kelleher

(10) Patent No.: US 8,434,976 B2
(45) Date of Patent: May 7, 2013

(54) SMALL HOLE SAW MANDREL ASSEMBLY

(75) Inventor: Joseph Kelleher, Bowie, MD (US)

(73) Assignee: Black & Decker Inc., Newark, DE (US)

( * ) Notice: Subject to any disclaimer, the term of this patent is extended or adjusted under 35 U.S.C. 154(b) by 1083 days.

(21) Appl. No.: 12/408,052

(22) Filed: Mar. 20, 2009

(65) Prior Publication Data
US 2010/0239381 A1 Sep. 23, 2010

(51) Int. Cl.
B23B 51/04 (2006.01)

(52) U.S. Cl.
USPC .................. 408/204; 408/239 R; 279/141

(58) Field of Classification Search .................. 279/141, 279/28; 408/239 R, 238, 204; 403/321, 403/322.1, 322.2
See application file for complete search history.

(56) References Cited

U.S. PATENT DOCUMENTS

| | | | |
|---|---|---|---|
| 2,556,155 A | 6/1951 | Stellin |
| 2,674,026 A | 4/1954 | St. Palley |
| 2,826,231 A | 3/1958 | Alden |
| 2,917,975 A | 12/1959 | Samuel |
| 3,262,474 A | 7/1966 | Enders |
| 3,267,975 A | 8/1966 | Enders |
| 3,424,212 A | 1/1969 | Kemper |
| 3,456,548 A | 7/1969 | Schmidt et al. |
| 3,778,179 A | 12/1973 | Rivas |
| 3,784,316 A | 1/1974 | Bittern |
| 3,854,840 A | 12/1974 | Miyanaga |
| 3,970,407 A | 7/1976 | Uffman |
| 4,148,593 A | 4/1979 | Clark |
| 4,461,195 A | 7/1984 | Barnick |
| 4,941,790 A | 7/1990 | Kirn |
| 5,108,235 A | 4/1992 | Czyzewski |
| 5,154,552 A | 10/1992 | Koetsch |
| 5,175,963 A | 1/1993 | Schafer et al. |
| 5,226,762 A | 7/1993 | Ecker |
| 5,246,317 A | 9/1993 | Koetsch et al. |
| 5,352,071 A | 10/1994 | Cochran et al. |
| 5,427,482 A | 6/1995 | Asano et al. |
| 5,429,457 A | 7/1995 | Asano et al. |
| 5,597,274 A | 1/1997 | Behner |
| 5,624,213 A | 4/1997 | Anderson |
| 5,658,102 A | 8/1997 | Gale |
| 5,690,452 A | 11/1997 | Baublits |
| 5,868,532 A | 2/1999 | Spenser |

(Continued)

FOREIGN PATENT DOCUMENTS

| | | |
|---|---|---|
| DE | 1 992 344 | 8/1968 |
| DE | 74 30 652 | 12/1974 |

(Continued)

*Primary Examiner* — Daniel Howell
*Assistant Examiner* — Justin Sikorski
(74) *Attorney, Agent, or Firm* — Harness, Dickey & Pierce, P.L.C.

(57) ABSTRACT

A holesaw mandrel assembly has a mandrel with a first shanking end, a body, and a second extending end that includes a threaded spud to receive a holesaw. A first member is secured on the second end. The first member is axially slidable on the second end. The first member also includes a friction surface to contact the holesaw. The friction surface moves between a first engaging position and a second disengaging position. A mechanism on the mandrel moves the friction surface between its engaged and disengaged positions. The mechanism includes a biased collar and a bearing race. A mating connection enables rotation of the collar which, in turn, enables the friction surface to move between its engaged and disengaged positions.

18 Claims, 5 Drawing Sheets

U.S. PATENT DOCUMENTS

| | | | |
|---|---|---|---|
| 5,921,562 A | 7/1999 | Robison | |
| 5,967,709 A | 10/1999 | Thuesen | |
| 6,071,219 A | 6/2000 | Cook | |
| 6,120,221 A | 9/2000 | Alm | |
| 6,302,409 B1 | 10/2001 | Gutsche | |
| 6,341,925 B1 | 1/2002 | Despres | |
| 6,357,973 B2 | 3/2002 | Chao | |
| 6,409,436 B1 | 6/2002 | Despres | |
| 6,588,993 B2 | 7/2003 | Omi | |
| 6,623,220 B2 | 9/2003 | Nuss et al. | |
| 6,682,283 B2 | 1/2004 | Mann et al. | |
| 6,705,807 B1 | 3/2004 | Rudolph et al. | |
| 6,887,018 B2 | 5/2005 | Ostermeier | |
| 6,939,092 B2 | 9/2005 | Korb et al. | |
| 7,073,992 B2 | 7/2006 | Korb et al. | |
| 7,112,016 B2 | 9/2006 | Nordlin | |
| 7,220,091 B2 * | 5/2007 | Takahashi et al. | 411/432 |
| 7,380,798 B2 | 6/2008 | Wolters | |
| 7,488,146 B2 | 2/2009 | Brunson | |
| 7,517,179 B2 | 4/2009 | Miller et al. | |
| 7,959,371 B2 * | 6/2011 | Keightley | 403/348 |
| 2001/0001276 A1 | 5/2001 | Chao | |
| 2002/0083807 A1 | 7/2002 | Gascoyne | |
| 2002/0122703 A1 | 9/2002 | Czyzewski et al. | |
| 2005/0025591 A1 | 2/2005 | Korb et al. | |
| 2007/0160435 A1 | 7/2007 | Chao | |
| 2008/0025382 A1 | 1/2008 | Okado | |
| 2008/0050189 A1 | 2/2008 | Keightley | |
| 2008/0118316 A1 | 5/2008 | Miller et al. | |
| 2008/0253851 A1 | 10/2008 | Miller et al. | |

FOREIGN PATENT DOCUMENTS

| | | |
|---|---|---|
| DE | 2624370 | 4/1980 |
| DE | 32 14 209 | 10/1983 |
| DE | 36 44 440 | 7/1988 |
| DE | 38 24 040 | 11/1989 |
| DE | 295 09 238 | 9/1995 |
| DE | 299 17 867 | 4/2000 |
| DE | 102 33 365 | 4/2004 |
| DE | 10 2004 020 723 | 11/2005 |
| EP | 0 235 581 | 10/1989 |
| EP | 0 732 164 | 8/1999 |
| EP | 0 811 449 | 7/2001 |
| EP | 0 776 721 | 11/2002 |
| EP | 1 193 014 | 7/2004 |
| EP | 1 447 195 | 8/2005 |
| GB | 2257381 | 1/1993 |
| GB | 2295110 | 5/1996 |
| WO | WO 88/04975 | 7/1988 |
| WO | WO 97/49516 | 12/1997 |
| WO | WO 98/26890 | 6/1998 |
| WO | WO 01/38028 | 5/2001 |
| WO | WO 2004/085104 | 10/2004 |
| WO | WO 2005/000506 | 1/2005 |
| WO | WO 2005/120754 | 12/2005 |

* cited by examiner

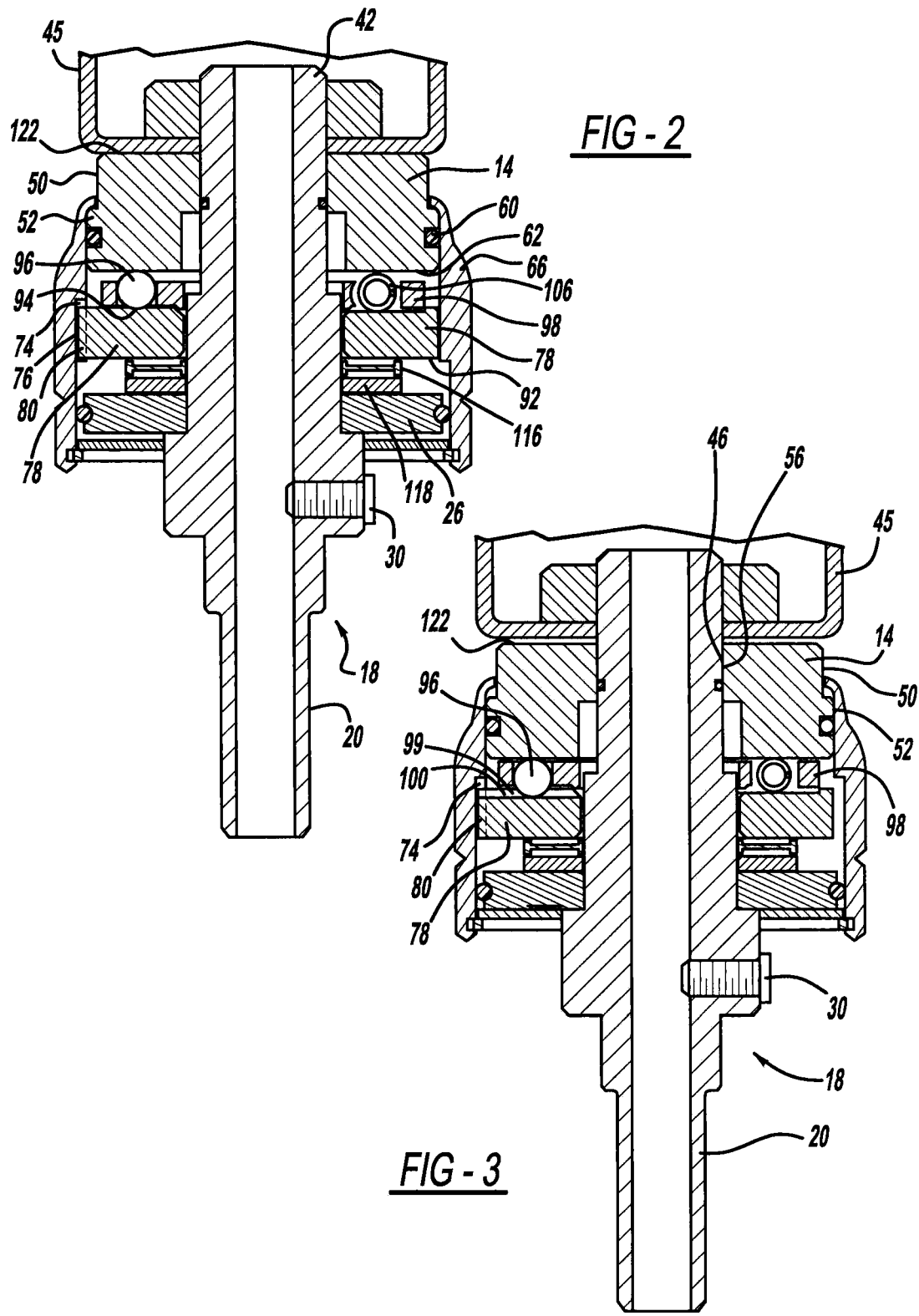

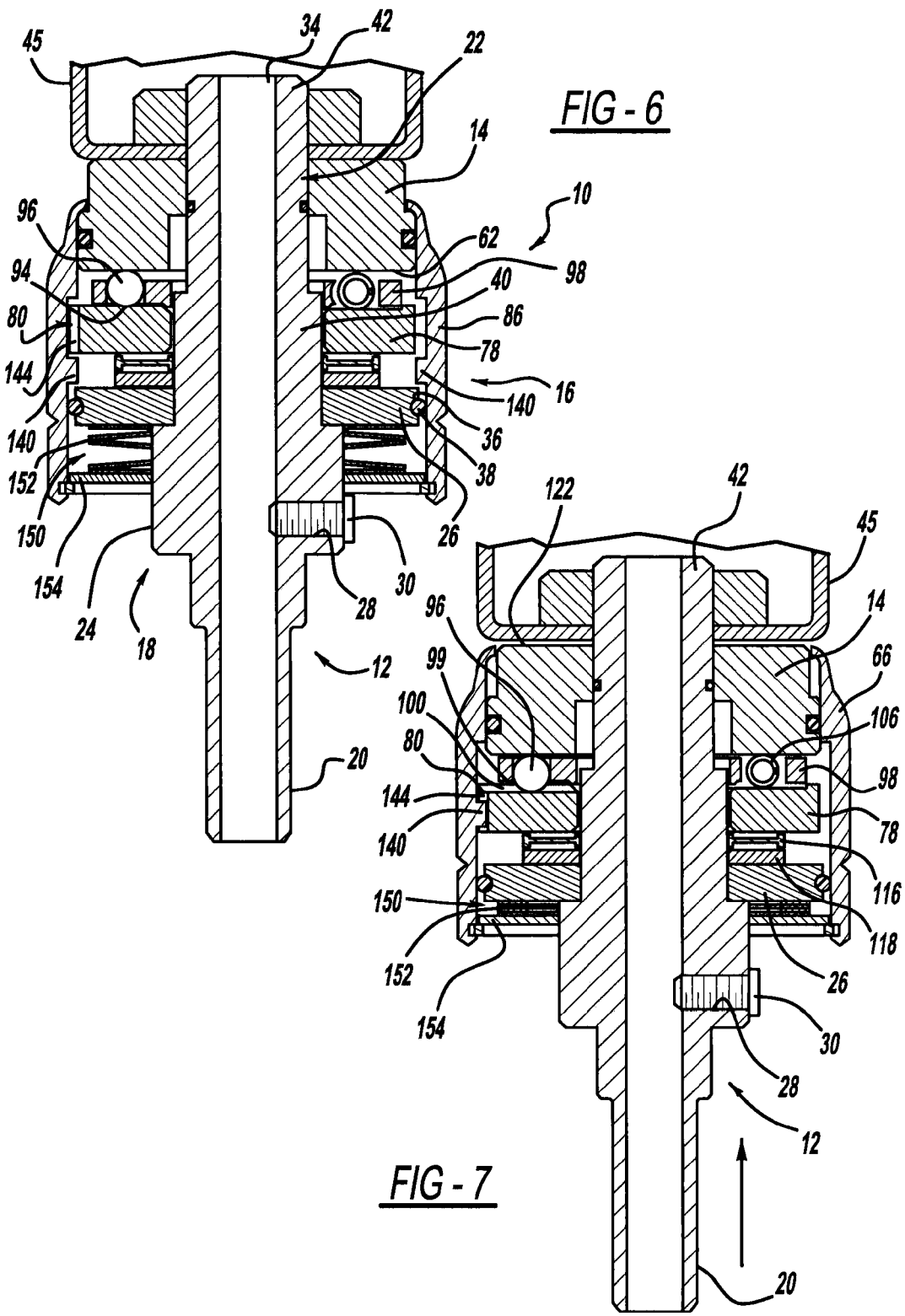

SMALL HOLE SAW MANDREL ASSEMBLY

FIELD

The present disclosure relates to holesaws and, more particularly, a mandrel assembly for receiving holesaws.

BACKGROUND

Various types of holesaw mandrel assemblies exist in the art. The assemblies are concerned with quick release device in order to readily remove the holesaw from the mandrel assembly after use. Various types of mechanisms have been utilized in order to secure the holesaw onto the mandrel assembly, all of which enable the holesaw to be removed. Some of these mandrel assemblies utilize pins or the like which fit into the base of the holesaw. The pins hold the holesaw in position during rotation and cutting. However, since the holesaw is not torqued down onto the collar adjacent the threaded spud, the pins can be removed from the base of the holesaw and the holesaw can be easily rotated and removed from the threaded spud.

When small diameter holesaws are utilized, the base of the holesaw does not includes holes to receive the pins on the mandrel assemblies. This is due to the fact that the diameter of the base is too small to register with the pins. Also, during use, due to the threaded engagement of the spud with the small holesaw, the holesaw is torqued down onto the collar of the mandrel assembly. Accordingly, a wrench or the like is required to loosen the holesaw from the mandrel collar in order to remove the holesaw from the mandrel assembly. The art does not provide a small holesaw mandrel that enables the user to quickly remove, by hand, the holesaw from the mandrel assembly. Thus, it is desirable to have a mandrel assembly that enables a quick release of small diameter holesaws.

The assignee of the present disclosure has developed a small hole saw mandrel that enables quick removal of small diameter hole saws, as illustrated in U.S. Publication Application No. 2008/0118316 (the specification and drawings of which are expressly incorporated by reference). While this mandrel assembly performs satisfactorily, designers strive to improve the art.

SUMMARY

The present disclosure provides the art with a holesaw mandrel assembly that enables a quick release of small holesaws from the mandrel assembly. The present holesaw mandrel assembly provides a friction face that abuts the holesaw. The friction face axially moves away from holesaw into a released position. The holesaw assembly enables the friction face to be automatically moved back to its original position.

According to a first aspect of the disclosure, a holesaw mandrel assembly comprises a mandrel having a body with a first end to couple with a drill motor. A second end extends from the body. The second end includes a threaded spud to receive a holesaw. The second end may also include a bore to receive a pilot bit. A first member is on the second end. The first member is axially movable on the second end. A friction surface is on the first member. The friction surface is adapted to contact a base surface of the holesaw to fix the holesaw in position. The friction surface moves between a first contact and a second release position. A mechanism is on the mandrel adjacent the first member. The mechanism moves the friction surface between the first and second positions. The mechanism further comprises a biased collar and bearing race. The collar and bearing race include a mating connection to enable rotation of the collar which, in turn, enables the friction surface to move between the contact and release positions. The mating mechanism includes a pair of teeth. At least one tooth is on the collar and at least one tooth is on the bearing race. Preferably, one tooth is on the bearing race and a plurality of teeth is on the collar. A compression spring biases the collar. The collar is moved axially and rotated to engage the mating mechanism.

According to a second aspect of the disclosure, a holesaw mandrel assembly comprises a mandrel having a body with a first end to couple with a drill motor. A second end extends from the body. The second end includes a threaded spud to receive a holesaw. The second end may also include a bore to receive a pilot bit. A cylindrical member is on said second end. The first cylindrical member is axially movable on the second end. A friction surface is on the cylindrical member. The friction surface is adapted to contact a base surface of the hole saw such that the hole saw is fixed in position. The friction surface moves between a first contact and a second release position. A second surface is on the cylindrical member. The second surface is substantially parallel to the friction face. A mechanism is on the mandrel adjacent the first member to move the friction surface between the first and second positions. The mechanism comprises an axially biased collar and a bearing race. A plurality of balls is held by a cage. The plurality of balls is sandwiched between the cylindrical member second face and the bearing race. The bearing race includes a track and a plurality of pockets along the track to receive the plurality of balls. The collar has a plurality of mating projections extending radially inward from an inner surface of the collar. The bearing race has a mating member projecting radially outward from a circumferential surface of the bearing race to mate with one of the plurality of mating projections. A compression spring is on the mandrel first end. The compression spring is associated with the collar. The collar is moved axially toward the second mandrel end, compressing the compression spring, as the collar moves axially. The plurality of projections is aligned with the bearing race projection. The collar is rotated so that the projections mate with one another. The plurality of balls, in turn, moves in the track until the plurality of balls drops into the pockets so that the friction surface axially moves toward the first end of the mandrel to its release position to enable removal of said hole saw.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a cross-section view of a holesaw assembly of FIG. 1.

FIG. 3 is the same view as FIG. 2 with the assembly in a second position.

FIG. 6 is a cross-section view of an additional embodiment of the hole saw mandrel.

FIG. 7 is a view like FIG. 6 in a second position.

DETAILED DESCRIPTION

Figure 1:
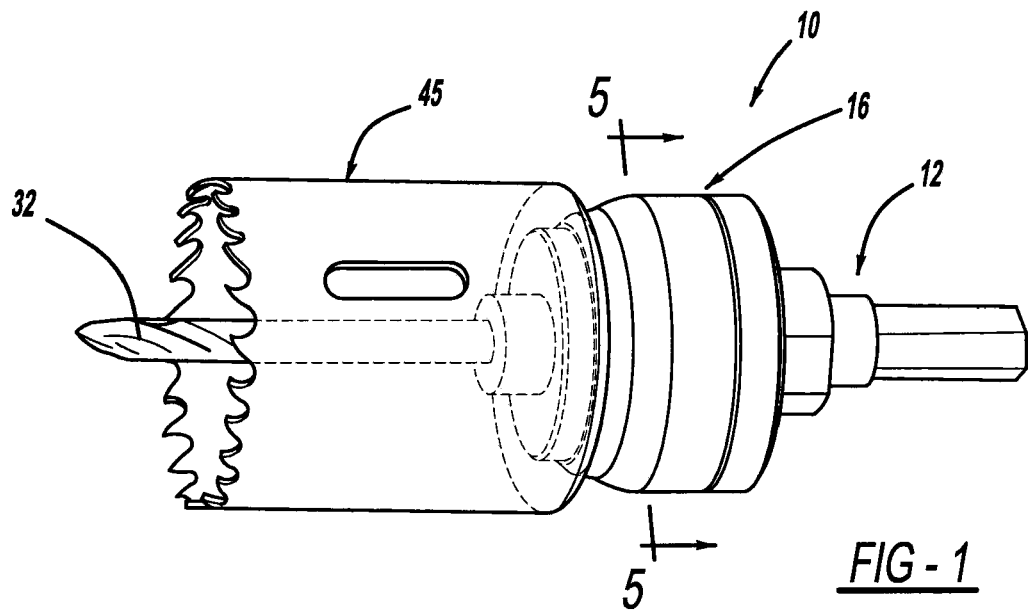
FIG. 1 is a perspective view of a holesaw mandrel assembly with an attached holesaw.
Figure 5:
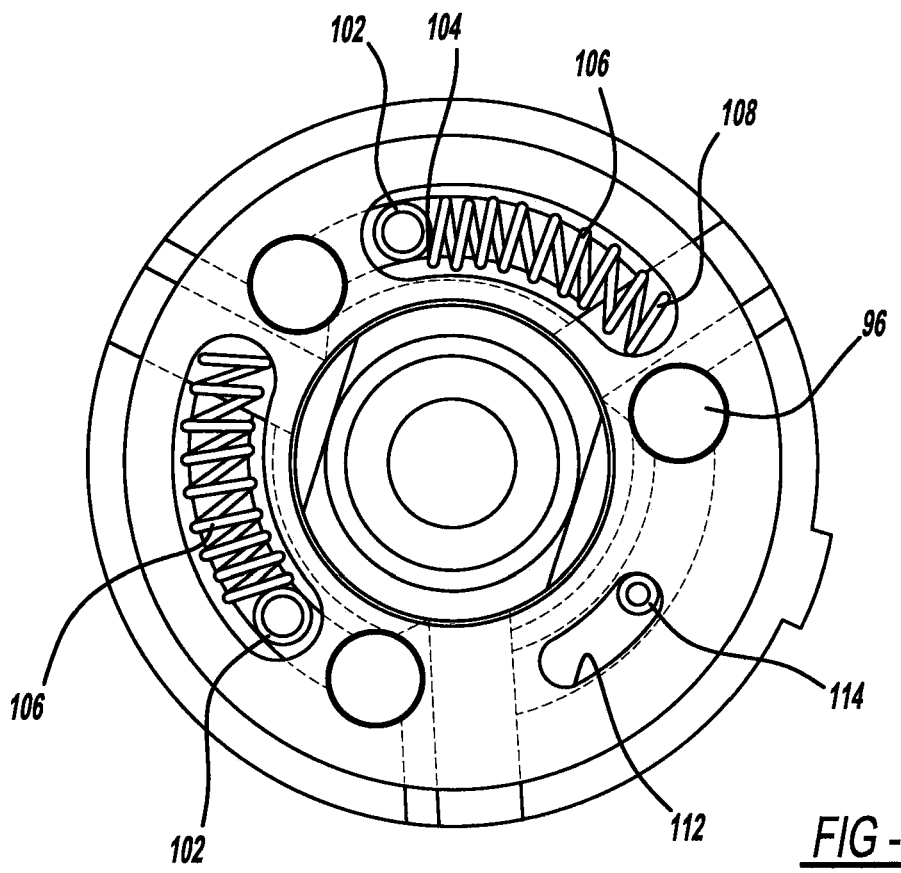
FIG. 5 is a cross-section view of FIG. 1 along line 5-5 thereof.
Figure 4:
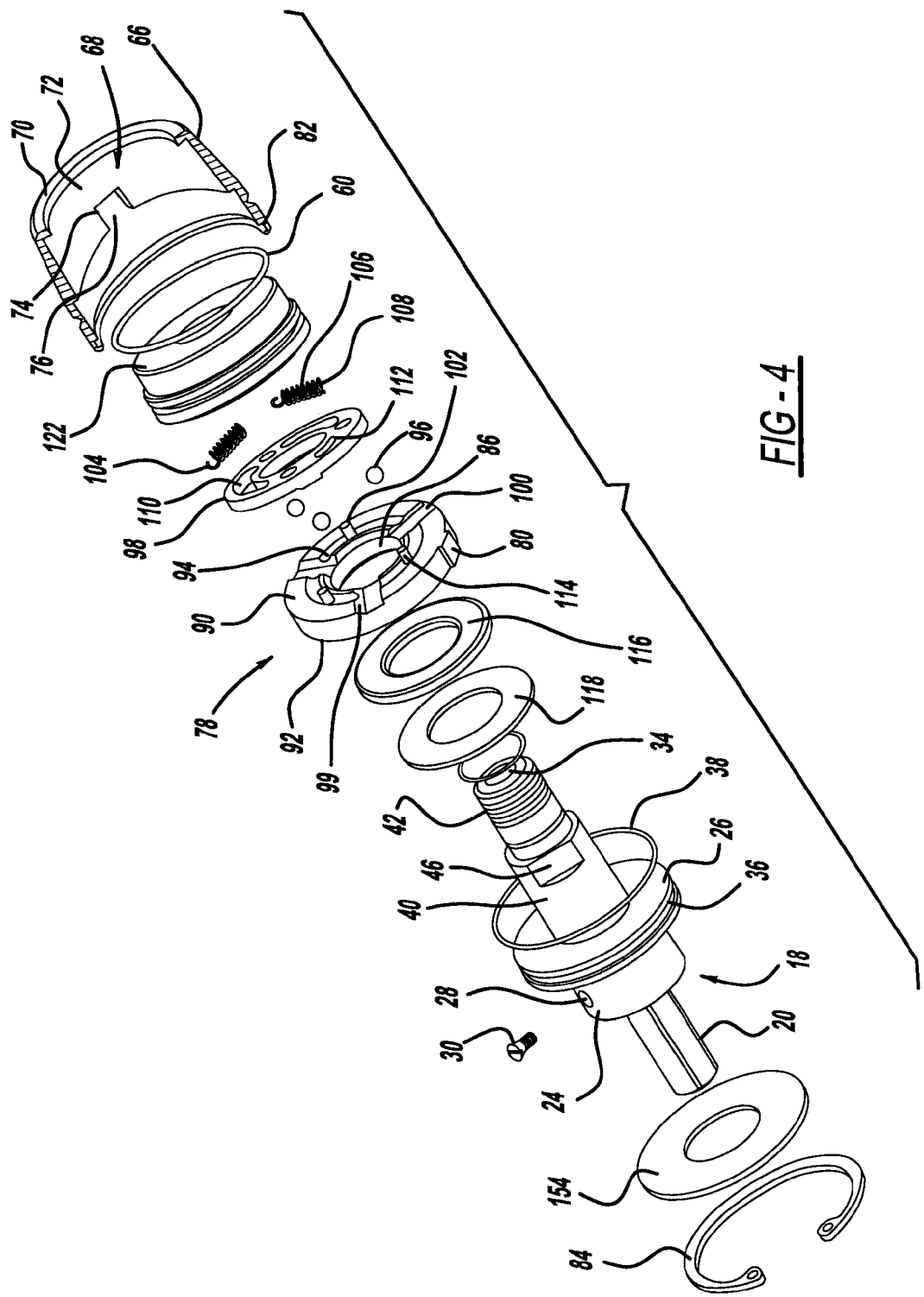
FIG. 4 is an exploded perspective view of the holesaw mandrel assembly of FIG. 1.

The following description is merely exemplary in nature and is not intended to limit the present disclosure, application, or uses.

Turning to the figures, a holesaw mandrel assembly is illustrated and designed with the reference numeral 10. The holesaw mandrel assembly 10 includes a mandrel 12, a first axially movable member 14 and a mechanism 16 for moving the first member 14 between a first hole saw contact and second hole saw release position.

The mandrel 12 includes a body 18 with a first projecting end 20 and a second extending end 22. The first projecting end 20 is cylindrical and may have an outer polygonal surface to connect the mandrel with a rotating tool, such as a drill 32. The body 18 has an overall cylindrical shape with a first cylindrical portion 24 and a larger cylindrical shaped portion 26. The first cylindrical portion 24 includes an aperture 28 to receive a fastener 30 that retains a pilot drill bit 32 in a bore 34. The drill bit 32 extends through the second extending member 22. The second cylindrical portion 26 includes a peripheral groove 36 that receives a sealing O-ring 38.

The second extending end 22 of the mandrel 12 includes a first cylindrical portion 40 and a threaded spud 42. The threaded spud 42 receives a holesaw 45 in a conventional manner. The first cylindrical portion 40 includes a pair of flat surfaces 46 that receive the first member 14. The surfaces 46 mate with surfaces in the first member 14 to enable the first member 14 to axially slide on the second extending end 22 of the mandrel 12. However, the flat surfaces 46 fix the first member 14 against rotation about the second extending end 22 of the mandrel 12.

The first member 14 has an overall annular configuration. The first member 14 includes a bore 48 that extends through the first member 14. The bore 48 enables the first member 14 to be positioned onto the second end 22 of the mandrel 12. The first member 14 includes a pair of cylindrical portions 50 and 52. The first cylindrical portion 50 extends from the second cylindrical portion 52. A shoulder 54 is formed between the two portions 50, 52. The bore 48, extending through the first portion 50, has a substantially circular configuration. The wall defining the bore 48, in the second cylindrical portion 52, includes a pair of flat surfaces 56. The flat surfaces 56 mate with the flat surfaces 46 of the second end 22 of the mandrel 12. Thus, the pair of flat surfaces 46, 56 prohibits rotation, while enabling axial movement, of the first member 14 on the second end 22 of the mandrel 12.

The second cylindrical portion 52 includes a circumferential groove 58 that receives a sealing O-ring 60. The cylindrical portion 52 includes a flat annular bottom surface 62.

The mechanism 16 for moving the first member 14 between a first hole saw contact and second hole saw release position includes an outer sleeve or collar 66. The collar 66 has an overall cylindrical shape with a central bore 68. The collar 66 includes a lip 70, at one end, that rests on shoulder 54 to retain the first member and mechanism 16 on the mandrel 12. The collar 66 includes an internal cylindrical surface 72 that defines the bore 68. The internal surface 72 includes a cavity 74 that includes a flat surface 76 that define a rectangular groove, to key or mate with a tooth 80 on bearing race 78. Also, the interior surface includes a channel 82 that receives a C-clip 84. The C-clip 84 is positioned behind the second cylindrical body portion 26 to retain the first member 14 and mechanism 16 onto the mandrel 12.

The bearing race 78 includes a central bore 86, with a circular configuration, that fits onto the cylindrical portion 40 of the second end 22 of the mandrel 12. The bearing race 78 includes tooth 80 about its periphery. The tooth 80 keys or mates with the collar 66 for rotation with the collar 66 about the second end 22. The bearing race 78 includes two surfaces 90, 92 parallel with one another. The surface 92 is flat. The surface 90 includes a plurality of arcuate tracks 94 to receive balls 96 that are retained by a cage 98. The arcuate tracks 94 lead into, via ramps 99, pockets 100. A plurality of pins 102 project from the surface 90, the pins retain an end 104 of the circumferential springs 106. The other end 108 of the circumferential springs 106 is retained on the cage 98. The springs 106 are positioned in slots 110 in the cage 98. The cage 98 includes a smaller slot 112 that includes pin 114, projecting from surface 90, to limit rotational movement of the cage 98 on the bearing race 78.

A thrust bearing 116 and washer 118 are positioned below the bearing race 78. The washer 118 abuts the cylindrical portion 26 of the mandrel body. The thrust bearing 116 may be of the needle roller ball, or the like, bearing. Also, a thrust bearing made of a low friction material such as Teflon® may be used. The thrust bearing 116 provides for a substantially friction free rotation of the bearing race 78.

A plurality of rollers or balls 96, preferably three, is positioned in the tracks 94 between the bearing race surface 90 and the first member 14, as best seen in FIGS. 2 and 3. The rollers 96 are sandwiched between the tracks 94 and the flat bottom surface of the first member 14. The circumferential springs 106 are positioned to hold the cage 98 and bearing race 78 against rotation and to return the first member 14 from a second position (FIG. 3) to its first original position (FIG. 2).

The first member 14 and rotational mechanism 16 are positioned onto the mandrel 12 as illustrated in FIGS. 1-3. The rollers or balls 96, in a first position, are positioned in the tracks 94 between the first member 14 and the bearing race 78. At this time, a holesaw 45 is screwed onto the mandrel threaded spud 42. The holesaw 45 is screwed onto the spud 42 until it contacts a friction surface 122 of the first member 14. This is illustrated in FIG. 2. The holesaw 45 and mandrel assembly 10 are now ready for use. After using the holesaw 45, the holesaw 45 may be quickly removed from the mandrel assembly 10. However, due to rotation of the mandrel and the reverse torque caused between the holesaw 45 and the workpiece, there is a tendency for the holesaw 45 to tighten against the friction face 122 of the first member 14.

Once the holesaw 45 is used, and in order to remove it from the mandrel assembly 10, the collar 66 is rotated with respect to the mandrel body 18. As the collar 66 is rotated, the bearing race 78, as well as the cage 98, is rotated with the collar 66. As this occurs, the rollers or balls 96 roll along the tracks 94 of the bearing race 70 and flat surface of cylindrical portion 52, respectively, as illustrated in FIG. 2. Also, the springs 106 are compressed. The cage 98 continues to rotate until the cage slot 112 contacts pin 114. At this point, the balls 96 move down ramps 99 into the pockets 100. As this occurs, the first member 14 moves axially along the mandrel second end 22 away from the holesaw 45 toward the second cylindrical portion 26 of the mandrel body 18. As this happens, the friction face 122 moves away from the holesaw 45. Thus, the holesaw 45 can be easily rotated and removed from the threaded spud 42. Thus, wrenches or tools are not required to remove the holesaw 45 from the mandrel assembly 10.

After the holesaw is removed and the rotational force on the collar 66 is released, the circumferential springs 106 return to their original condition in the slots 110 of the cage 98 to return the rollers or balls 96 back to their original position. Thus, the mandrel assembly 10 is ready for additional use.

Figure 8:
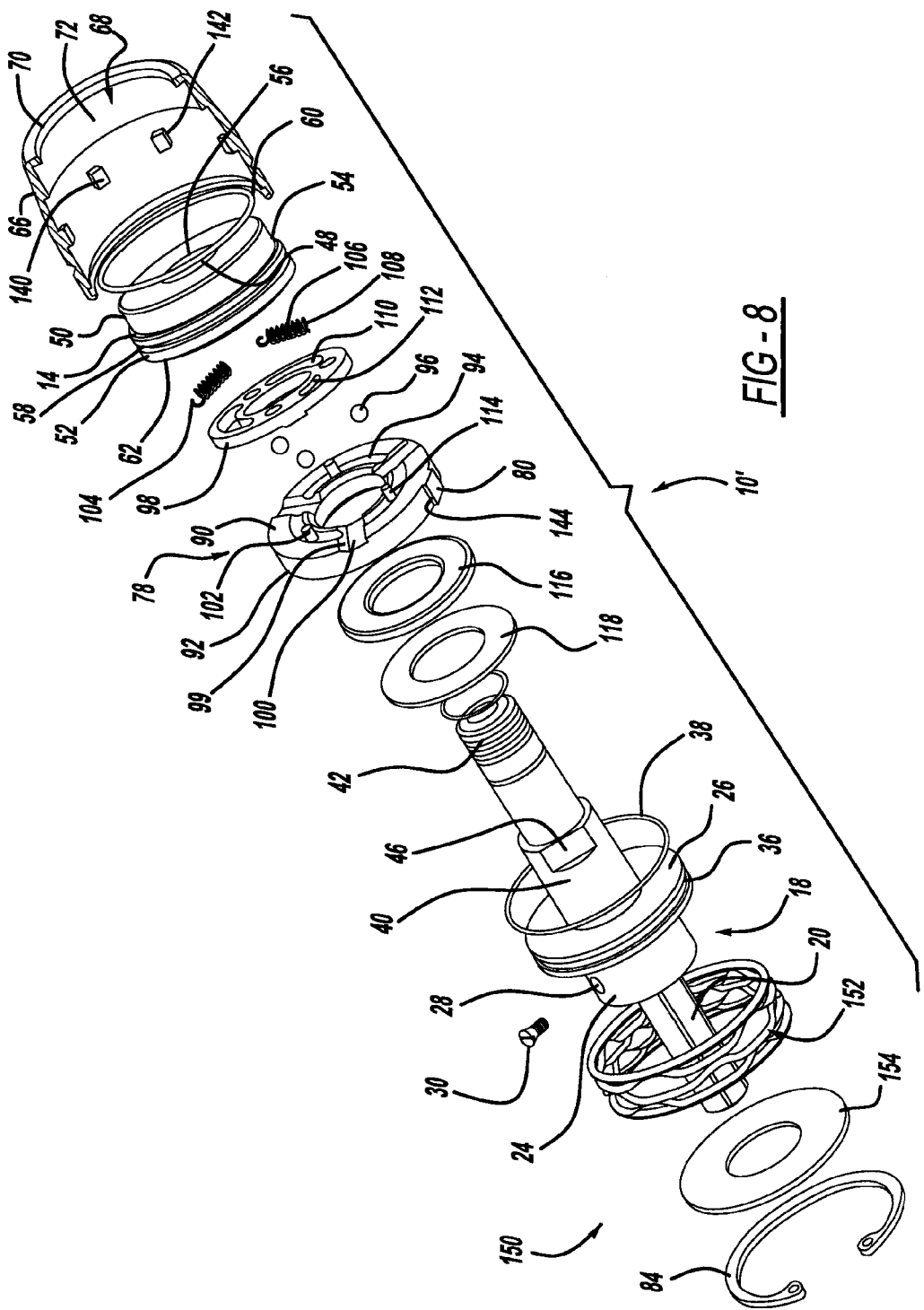
FIG. 8 is an exploded perspective view of the hole saw mandrel assembly of FIG. 6.

Turning to FIGS. 6-8, a second embodiment is illustrated. The second embodiment is similar to the first and thus the reference numerals used in the first embodiment will be used in the second to identify the same elements. The differences are in the mating connection between the collar 66 and the bearing race 78.

The mandrel assembly 10' is like that described above. The outer sleeve or collar 66 differs in that it is devoid of a cavity. The internal cylindrical surface includes a plurality of projecting teeth 140. The plurality of teeth 140 are spaced about the periphery of the cylindrical surface 72 so that upon rotation of the collar 66, one of the plurality of teeth 140 will mate or mesh with tooth 80 on bearing race 78. The plurality of teeth 140 each have an overall rectangular shape, however, any shape with a side surface 142 may be used.

Additionally, the mandrel assembly 10' includes a biasing mechanism 150. The biasing mechanism 150 includes one or more compression springs 152. The compression springs 152 are sandwiched between the flat bottom surface of the larger cylindrical shaped portion 26 and a washer 154. The C-clip 84 is positioned behind the washer 154 to retain the first member 14 and mechanism 16 onto the mandrel 12. The hole saw 45 is positioned onto the mandrel 10' and used as discussed above. Only the removal of the hole saw is different.

In order to remove the hole saw 45, the collar 66 is moved axially in a direction toward the threaded spud 42. As this occurs, the compression spring 152 is compressed between the large cylindrical shaped portion 26 and washer 154 as illustrated in FIGS. 6-8. The plurality of teeth 140 is moved axially toward the spud 42. The side surfaces 142 are aligned with the side surface 144 of the tooth 80. The collar 66 is rotated until one of the plurality of teeth 140 mesh or key with the bearing race tooth side face 144. The bearing race 78 is rotated as described above until the ball 96 drop into pockets 100 enabling the hole saw 45 to be removed from the mandrel assembly 10' as described above.

Upon removal of the rotational force, the circumferential springs 106 move the balls 96 along the ramps 99 out of pockets 100 back into tracks 94. As this occurs, simultaneously, the compression spring 152 extends disengaging one of the pluralities of teeth 140 from the tooth 80, returning the collar 66 back to its original position. Thus, in its original disengaged position, the collar 66 is enabled to be rotated with respect to the mandrel body 12.

The description of the invention is merely exemplary in nature and, thus, variations that do not depart from the gist of the invention are intended to be within the scope of the invention. Such variations are not to be regarded as a departure from the spirit and scope of the disclosure.

What is claimed is:

1. A hole saw mandrel assembly comprising:
    a mandrel having a body with a first end for coupling with a drill motor, a second end extending from said body, said second end including a thread for receiving a hole saw;
    a first member on said second end, said first member axially movable on said second end;
    a friction surface on said first member, said friction surface adapted for contacting a base surface on the hole saw such that the hole saw is fixed in position, said friction surface moving between a first contact and a second release position;
    a mechanism on said mandrel adjacent said first member for moving said friction surface between said first and second positions; and
    said mechanism including an auxiliary biased collar and a bearing race, the collar and bearing race are separate and distinct from one another, said collar and bearing race having a mating mechanism for enabling rotation of said bearing race which, in turn, enables said friction surface to move between said contact and release positions.

2. The mandrel assembly according to claim 1, wherein said mating mechanism further comprises a pair of members, at least one member on said collar and at least one member on said bearing race.

3. The mandrel assembly of claim 1, wherein a compression spring biases said collar.

4. The mandrel assembly of claim 1, wherein said collar is moved toward said second end for engaging said mating mechanism.

5. The mandrel assembly of claim 1, wherein upon release of a rotational force on said collar, said biasing mechanism returns said collar to its original position.

6. The mandrel assembly of claim 2, wherein said collar has one tooth and said bearing race includes a plurality of teeth.

7. The mandrel assembly of claim 1, wherein a plurality of rollers are between said first member and said bearing race, said bearing race includes a plurality of pockets for receiving said plurality of rollers for enabling said friction surface to move axially from said first to said second position.

8. A hole saw mandrel assembly comprising:
    a mandrel having a body with a first end for coupling with a drill motor, a second end extending from said body, said second end including a thread for receiving a hole saw;
    a cylindrical member on said second end, said first cylindrical member axially movable on said second end, a friction surface on said cylindrical member, said friction surface adapted for contacting a base surface of the hole saw such that the hole saw is fixed in position, said friction surface moving between a first contact and a second release position, a second surface on said cylindrical member, said second surface substantially parallel to said friction face;
    a mechanism on said mandrel adjacent said cylindrical member for moving said friction surface between said first and second positions, said mechanism comprising an axially biased collar and a bearing race, a plurality of balls are held by a cage, said plurality of balls are sandwiched between said cylindrical member second face and said bearing race, said bearing race including a track and a plurality of pockets along said track for receiving said plurality of balls, said collar having a plurality of mating projections extending radially inward from an inner surface of said collar, said bearing race having a mating member projecting radially outward from a circumferential surface of said bearing race for mating with one of said plurality of mating projections;
    a compression spring on said mandrel first end, said compression spring associated with said collar so that said collar is axially moved toward said second mandrel end compressing said compression spring, as said collar moves axially, said plurality of projections are aligned with said bearing race projection, said collar is rotated so that said projections mate with one another, said plurality of balls, in turn, move in said tracks until said plurality of balls drop into said pockets so that said friction surface axially moves toward said first end of said mandrel to its release position enabling removal of said hole saw.

9. The mandrel assembly of claim 8, wherein said cage includes a pair of return springs for rotating said collar back into position.

10. The mandrel assembly of claim 9, wherein said pair of return springs are positioned in a slot in said cage, each spring having two ends, one secured with said cage and the other end secured with a pin extending from said bearing race.

11. The mandrel assembly of claim 8, wherein said cage and bearing race include a mechanism for controlling travel of said cage with respect to said bearing race.

12. The mandrel assembly of claim 11, wherein said control mechanism includes a slot in said cage and a pin projecting from said bearing race into said slot.

13. A hole saw mandrel assembly comprising:
a mandrel having a body with a first end for coupling with a drill motor, a second end extending from said body, said second end including a thread for receiving a hole saw;
a first member on said second end, said first member axially movable on said second end;
a friction surface on said, first member, said friction surface adapted for contacting a base surface on the hole saw such that the hole saw is fixed in position, said friction surface moving between a first contact and a second release position;
a mechanism on said mandrel adjacent said first member for moving said friction surface between said first and second positions;
said mechanism including an auxiliary biased collar and a bearing race, said collar and bearing race having a mating mechanism for enabling rotation of said bearing race which, in turn, enables said friction surface to move between said contact and release positions; and
the collar is moved toward said second end for engaging said mating mechanism.

14. The mandrel assembly according to claim 13, wherein said mating mechanism further comprises a pair of members, at least one member on said collar and at least one member on said bearing race.

15. The mandrel assembly of claim 13, wherein a compression spring biases said collar.

16. The mandrel assembly of claim 13, wherein upon release of a rotational force on said collar, said biasing mechanism returns said collar to its original position.

17. The mandrel assembly of claim 13, wherein said collar has one tooth and said bearing race includes a plurality of teeth.

18. The mandrel assembly of claim 13, wherein a plurality of rollers are between said first member and said bearing race, said bearing race includes a plurality of pockets for receiving said plurality of rollers for enabling said friction surface to move axially from said first to said second position.

* * * * *